(No Model.)
W. D. RODGERS.
NUT LOCK.
No. 476,316.  Patented June 7, 1892.
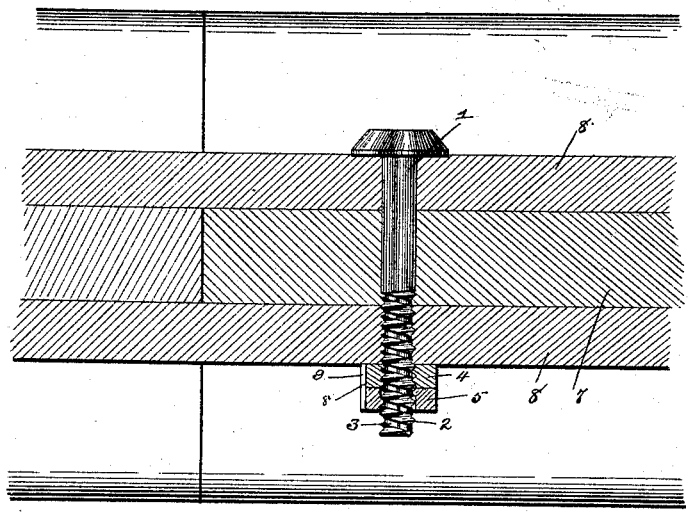
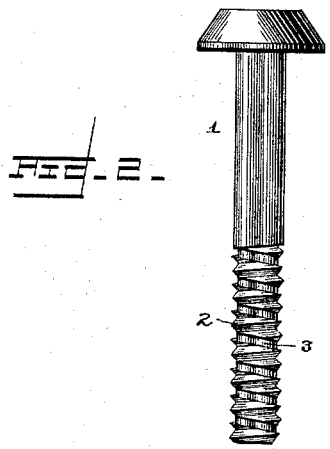
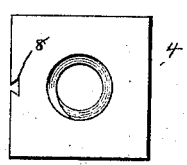
Witnesses:
E. S. Duvall Jr.
W. S. Duvall
Inventor
William D. Rodgers.
By his Attorneys,
C. A. Snow & Co.

UNITED STATES PATENT OFFICE.

WILLIAM D. RODGERS, OF WARRENTON, NORTH CAROLINA.

NUT-LOCK.

SPECIFICATION forming part of Letters Patent No. 476,316, dated June 7, 1892.

Application filed January 11, 1892. Serial No. 417,712. (No model.)

*To all whom it may concern:*

Be it known that I, WILLIAM D. RODGERS, a citizen of the United States, residing at Warrenton, in the county of Warren and State of North Carolina, have invented a new and useful Nut-Lock, of which the following is a specification.

This invention relates to improvements in nut-locks of that class known as "thread;" and the object in view is to provide a cheap and simple means for readily and securely locking nuts upon bolts, and more especially upon that class of bolts employed in rail-joints and shaking parts of machinery wherein the nut under ordinary circumstances is apt to loosen.

With this object in view the invention consists in certain features of construction hereinafter specified, and particularly pointed out in the claims.

Referring to the drawings, Figure 1 is a transverse section of the rail-joint, the bolt of which is provided with nuts locked thereon in accordance with my invention. Fig. 2 is an elevation in detail of the bolt; Fig. 3, transverse sections of the two nuts. Fig. 4 is a plan of one of the nuts.

Like numerals of reference indicate like parts in all the figures of the drawings.

The bolt 1 is provided with the usual thread 2, and in addition to the same has formed in its threaded portion an oppositely-disposed spiral thread-groove or female thread 3.

Upon the thread 1 the usual tap or nut 4 is designed to fit, and is run down upon the bolt by rotation to the right.

5 designates a jam tap or nut, the perforation of which is provided with a superficial or male thread 6, designed to fit in the groove 3 of the bolt and to be run down upon the same by rotation to the left. The groove 3 is preferably formed somewhat deeper than the threads 1 of the bolt, but may be of the same depth, if so desired.

7 designates a rail, and 8 the fish-plates, the web of the rail and plates being perforated for the reception of the bolt. The tap 4 is first run down and tightened in position by a wrench, after which the tap 5 is run down upon the top of the tap 4, so as to tighten against the same and is also tightened with a wrench. The tap 4 cannot move down the bolt or toward the fish-plate, nor can it be jarred off the nut or turned to the left, as such action upon its part simply serves to bind it the more tightly against the inner face of the jam-nut 5. In other words, the nut 5 acts as an ordinary jam-nut, but the groove upon which it works is formed in the same portion of the bolt as is the thread upon which the inner nut works.

In the faces of the two nuts or at any other point I provide registering dovetail grooves 8, and when the same align insert therein an ordinary round wire 9 which, after insertion I upset or spread by a chisel or other device, and thus tie the two nuts together, the tie-wire being prevented from escaping from the dovetail recesses by reason of its having been upset, as described. When this wire is employed, the taps may be locked at any point along the bolt, and thus do not require any surface, as the fish-plate or other object, to be locked against, and are therefore useful in axle-spindles, crank-pins, &c.

It will be obvious that other means may be employed for tying the nuts together than that herein shown and described, and I do not limit my invention to the use of any specific means for this purpose.

It will be obvious that the positions of the nuts may be relatively changed and also that each of the threads may vary in form in cross-section.

Having described my invention, what I claim is—

The combination, with the bolt having the thread and a groove oppositely disposed to the thread and formed upon the same portion of the bolt as is the thread, of the main nut fitting the thread, the supplemental jam-nut for fitting the groove, the two nuts having recessed faces dovetailed in cross-section, and the tie-wire inserted in the grooves and upset therein, substantially as specified.

In testimony that I claim the foregoing as my own I have hereto affixed my signature in the presence of two witnesses.

WILLIAM D. RODGERS.

Witnesses:
I. W. HANNAFORD,
W. H. AYCOCK.